US012731796B2

(12) United States Patent
Hoeflich et al.

(10) Patent No.: US 12,731,796 B2
(45) Date of Patent: Sep. 8, 2026

(54) BIPOLAR PLATE, METHOD OF PRODUCTION, AND USE THEREOF

(71) Applicant: EKPO Fuel Cell Technologies GmbH, Dettingen (DE)

(72) Inventors: Alexander Hoeflich, Reutlingen (DE); Michael Goetz, Dettingen (DE); Alexander Groeh, Tuebingen (DE)

(73) Assignee: EKPO Fuel Cell Technologies GmbH, Dettingen (DE)

( * ) Notice: Subject to any disclaimer, the term of this patent is extended or adjusted under 35 U.S.C. 154(b) by 1154 days.

(21) Appl. No.: 17/720,001

(22) Filed: Apr. 13, 2022

(65) Prior Publication Data

US 2022/0246952 A1 Aug. 4, 2022

Related U.S. Application Data

(63) Continuation of application No. PCT/EP2020/077799, filed on Oct. 5, 2020.

(30) Foreign Application Priority Data

Oct. 14, 2019 (DE) ..................... 10 2019 127 626.8

(51) Int. Cl.

| | |
|---|---|
| ***H01M 8/0247*** | (2016.01) |
| ***H01M 8/0221*** | (2016.01) |
| ***H01M 8/0226*** | (2016.01) |
| ***H01M 8/0228*** | (2016.01) |
| ***H01M 8/10*** | (2016.01) |
| ***H01M 8/1081*** | (2016.01) |

(52) U.S. Cl.

CPC ....... *H01M 8/0247* (2013.01); *H01M 8/0221* (2013.01); *H01M 8/0226* (2013.01); *H01M 8/0228* (2013.01); *H01M 8/1081* (2013.01); *H01M 2008/1095* (2013.01)

(58) Field of Classification Search

CPC ... H01M 8/0204; H01M 8/0206; H01M 8/021

See application file for complete search history.

(56) References Cited

U.S. PATENT DOCUMENTS

| | | | | |
|---|---|---|---|---|
| 8,852,827 | B2 | 10/2014 | Jeong et al. | |
| 2005/0112443 | A1 | 5/2005 | Allin et al. | |
| 2006/0257555 | A1 | 11/2006 | Brady et al. | |
| 2007/0298267 | A1 | 12/2007 | Zhong et al. | |
| 2008/0113253 | A1 | 5/2008 | Yagi et al. | |
| 2010/0119913 | A1 | 5/2010 | Tanifuji et al. | |
| 2012/0321872 | A1* | 12/2012 | Nachshon-Galili | C09D 133/06 524/507 |
| 2014/0234748 | A1 | 8/2014 | Vincent et al. | |
| 2016/0200858 | A1* | 7/2016 | Fukuda | C09J 175/04 540/531 |

FOREIGN PATENT DOCUMENTS

| | | |
|---|---|---|
| GB | 1 204 866 | 9/1970 |

OTHER PUBLICATIONS

"Polyurethane" In: Wikipedia, The Free Encyclopedia, Aug. 31, 2019.

"Blockierte Isocyanate" In: Wikipedia, The Free Encyclopedia, Aug. 16, 2019.

* cited by examiner

*Primary Examiner* — Basia A Ridley
*Assistant Examiner* — Heng M. Chan
(74) *Attorney, Agent, or Firm* — Womble Bond Dickinson (US) LLP

(57) ABSTRACT

The present invention relates to a bipolar plate for a low-temperature fuel cell, in particular for a polymer electrolyte fuel cell, including a metal substrate with a coating on a surface of the substrate, the coating including an organic polymer and an electroconductive filler. The organic polymer is formed by chemical reaction of at least two components, including a bi- or polyfunctional isocyanate compound as the first component and one or more compounds having at least two free hydroxy or amino groups, as the second component.

19 Claims, No Drawings

BIPOLAR PLATE, METHOD OF PRODUCTION, AND USE THEREOF

CROSS-REFERENCE TO RELATED APPLICATIONS

This application is a continuation of international application number PCT/EP2020/077799, filed on Oct. 5, 2020, which claims the benefit of German application number 10 2019 127 626.8, filed on Oct. 14, 2019, which are incorporated herein by reference in their entirety and for all purposes.

BACKGROUND OF THE INVENTION

The present invention relates to a bipolar plate for a low-temperature fuel cell, in particular for a polymer electrolyte fuel cell, comprising a metal substrate with a coating on a surface of the substrate, the coating comprising an organic polymer and an electroconductive filler.

The invention also relates to a method for producing such a bipolar plate, and to the use of the bipolar plate in a low-temperature fuel cell, in particular in a polymer electrolyte fuel cell.

Bipolar plates are used in a fuel cell to provide electrical contact between the individual cells of the fuel cell stack. In the case of a polymer electrolyte fuel cell, a bipolar plate unit consisting of two bipolar plates alternates with a membrane electrode unit (MEA), the latter consisting of the polymer electrolyte and two electrodes formed as a gas diffusion layer. The bipolar plate unit preferably also enables the supply of the operating materials, i.e. the fuel (in particular hydrogen) on the anode side and the oxidizer (in particular oxygen) on the cathode side. For this purpose, the bipolar plates have an embossed structure with flow channels (flow field), which makes it possible to distribute the operating materials as optimally as possible over the entire surface of the bipolar plate.

In order to ensure sufficient corrosion resistance under the relevant electrochemical conditions, a coating of the surface of the metal substrate of the bipolar plate facing the MEA is usually required. Both organic and inorganic coatings are known from the prior art for this purpose.

Inorganic coatings can either be applied to the substrate by means of galvanic processes, or by means of coating processes such as PVD or CVD (as described, for example, in EP 2 157 645 B1). The disadvantage of these inorganic coatings is the relatively high cost, which results both from the costs of the materials used (especially gold or other precious metals) and from the complex processes (carried out in a vacuum).

Organic coatings for bipolar plates typically comprise a binder, in particular a polymer, and an electroconductive filler. Such a coating is disclosed, for example, in U.S. Pat. No. 8,852,827 B2. Further components are typically dispersing aids and additives to improve the wetting, rheology and/or processability of the coating.

The object of the invention is to provide a bipolar plate for a low-temperature fuel cell which has advantageous properties.

SUMMARY OF THE INVENTION

This object is achieved in the bipolar plate of the type mentioned in the introduction in accordance with the invention in that the organic polymer is formed by chemical reaction of at least two components, comprising a bi- or polyfunctional isocyanate compound as the first component and one or more compounds having at least two free hydroxy or amino groups as the second component.

The organic polymer, which in particular serves as a binder for the coating in the bipolar plate according to the invention, is thus based on a polyurethane or a polyurea, which is created by the addition reaction, known per se, of the hydroxy groups or amino groups of the second component to the isocyanate groups of the first component. When hydroxy and amino compounds are used as the second component, polyurethane/polyurea copolymers may also be formed accordingly.

The coating of the bipolar plate according to the invention has the required electroconductivity due to the electroconductive filler, with the particles of the filler being dispersed in the organic polymer. The organic polymers used in accordance with the invention provide the bipolar plate with numerous advantageous properties, which are described below.

The organic polymers according to the invention have predominantly or completely thermosetting properties, depending on the selection and the quantity ratio of the components used. They enable excellent corrosion resistance of the bipolar plate and have a very high resistance both to organic solvents and to acidic or alkaline aqueous solutions. At the same time, the coating is sufficiently flexible to allow embossing of the coated substrate to create the flowfield.

Lastly, the bipolar plate according to the invention can be produced more cost-effectively than a bipolar plate with an inorganic coating, since in particular no vacuum processes are necessary and higher strip speeds can be achieved. In addition, the starting materials are less expensive.

In the context of the present invention, the bipolar plate is a single metal substrate with a coating on one side. In a fuel cell stack, two bipolar plates in each case are preferably combined to form a bipolar plate unit, with the two substrates coated on one side being electroconductively connected to each other, in particular welded to each other, by means of their uncoated surfaces. The space formed between the two substrates can be used in particular for the passage of a coolant.

DETAILED DESCRIPTION OF THE INVENTION

The first component from which the organic polymer is formed may be selected from a very wide variety of isocyanate compounds, the molecular weight of which may vary over a wide range. In particular, the first component may be a bi- or polyfunctional isocyanate monomer, an oligomer of polyfunctional isocyanate monomers, or a prepolymer of polyfunctional isocyanate monomers and bi- or polyfunctional alcohols or amines. The term "polyfunctional" is used in the context of this description for at least trifunctional compounds, i.e. in distinction to bifunctional compounds. In the case of oligomers or prepolymers formed from polyfunctional monomers, free isocyanate groups are thus available for chemical reaction with the second component in order to form the organic polymer according to the invention.

In a preferred embodiment of the invention, the first component is an isocyanate monomer which is selected from diphenylmethane-2,2'-diisocyanate, diphenylmethane-2,4'-diisocyanate, diphenylmethane-4,4'-diisocyanate, toluene-2,6-diisocyanate, toluene-2,4-diisocyanate, tetramethylxylylene diisocyanate, 1,4-diisocyanatobenzene, 1,4-bis (isocyanatomethyl)benzene, 1,3-bis(isocyanatomethyl) benzene, tetramethylene diisocyanate, pentamethylene diisocyanate, hexamethylene diisocyanate, 2,4,4-trimethylhexamethylene-1,6-diisocyanate, 2,2,4-trimethylhexamethylene-1,6-diisocyanate, dodecamethylene diisocyanate, 1,4-diisocyanatocyclohexane, 1,3-bis(isocyanatomethyl) cyclohexane, 3-isocyanatomethyl-3,5,5-trimethylcyclohexyl isocyanate, 4,4'-diisocyanatodicyclohexyl methane, and isomers thereof.

Uretdione compounds, allophanate compounds, biuret compounds or isocyanurate compounds in particular can be used as di- or trimers of the above or other isocyanates. With such compounds, the functionality of the molecules to be polymerized and thus the degree of crosslinking of the polymer can be increased.

For the production of the organic polymer according to the invention, isocyanate compounds, including the above-mentioned monomers, can also be used for the chemical reaction and are provided with a protective group. In particular, isocyanate groups can be blocked by reaction with an oxime (e.g. butanone oxime or acetone oxime). Other blocking agents include, for example, 3,5-dimethylpyrazole, ε-caprolactam and diisopropylamine. Blocking allows a premix of the first and second components to be prepared and stored. During the production of the coating, the protective group is then thermally separated so that the components can react to form the organic polymer.

Within the scope of the invention, the second component can also be selected from monomers, oligomers and prepolymers with at least two free hydroxyl or amino groups. Suitable monomers are primarily alkanediols or alkanediamines, which can optionally be additionally substituted. By using comb polymers with several reactive hydroxyl or amino groups, the degree of crosslinking and thus the thermosetting behavior of the polymers formed can be influenced.

In an advantageous embodiment of the invention, the second component is selected from hydroxy- or amino-functional polyacrylates, polycarbonates, polyethers, polyesters, polylactones, polyolefins, polyamides, polyureas, alkyd resins and polyalkylsiloxanes. These react as prepolymers with the first component to form the organic polymer according to the invention. Particularly preferred are hydroxy-functional polyacrylates and polycarbonates, which are also referred to as polyacrylate polyols and polycarbonate polyols, respectively.

The one or more compounds used as the second component within the scope of the invention preferably have a molar mass in the range of 1,000 to 4,000 g/mol.

According to a particularly advantageous embodiment of the invention, the second component comprises one or more fluorinated compounds. These may be fluorinated monomers, oligomers or prepolymers with free hydroxy or amino groups. With the aid of fluorinated compounds, there is the advantageous possibility of increasing or selectively adjusting the degree of hydrophobicity of the coating of the bipolar plate according to the invention. The hydrophobic and hydrophilic properties of the coating are of great importance for the interactions with the gaseous operating materials and with the adjacent gas diffusion layer.

The one or more fluorinated compounds preferably have a degree of fluorination of 5 to 40%. The degree of fluorination can be used to adjust the hydrophobicity, with compounds having a high degree of fluorination also having a particularly high thermal resistance. Another advantageous way to adjust the hydrophobicity and other properties of the coating is to use different compounds as the second component, comprising both fluorinated and non-fluorinated compounds.

A fluorinated, hydroxy-functional polyacrylate can be used particularly advantageously as the second component.

In addition to the required first and second components, the organic polymer according to the invention can be formed by chemical reaction with an optional further (third) component or a plurality of further components. As a possible further component, for example, a carbodiimide can be used, which reacts with alcohols to form polyisoureas.

According to a further preferred embodiment of the invention, the organic polymer is additionally formed from a further component which serves as an adhesion promoter to the metal substrate, and which is preferably selected from aminosiloxanes. Particularly preferred is, for example, 3-aminopropyl-triethylsiloxane as a further component. This and similar aminosiloxanes, which can be used as monomers or oligomers, react on the one hand with the isocyanate groups of the first component, and on the other hand enable a quasi-covalent bonding to the metal substrate, as well as advantageously to the electroconductive filler. A particularly good adhesion and stability of the coating can thus be achieved.

A number of different materials can be used as electroconductive fillers and are advantageously present in the coating as finely dispersed particles. Preferably, the electroconductive filler is selected from tungsten carbide, titanium carbide, titanium boride, titanium nitride, carbon black, graphite, graphene and carbon nanotubes.

The coating of the bipolar plate according to the invention preferably has a thickness in the range of 1 to 20 μm, more preferably in the range of 3 to 15 μm.

In the bipolar plate according to the invention, the coated metal substrate preferably has an embossed structure which serves as a flow field for the supply of the fuel or the oxidizer in the fuel cell. Preferably, the embossed structure is produced after the coating has been applied to the substrate. As already mentioned above, the organic polymer according to the invention has sufficient flexibility to be able to carry out such embossing without damaging the coating.

The metal substrate of the bipolar plate according to the invention is preferably formed from steel, stainless steel, nickel, aluminum or titanium. Due to the excellent corrosion resistance and durability of the coating according to the invention, steel in particular can also be used as a substrate, with which there is a cost advantage compared to the alternatives mentioned.

The present invention further relates to a method for producing the bipolar plate according to the invention, the method comprising the following steps:

providing at least one metal substrate;

applying the first, the second and optionally further components as well as the electroconductive filler to one or both surfaces of the substrate;

allowing the components to react to form the organic polymer at elevated temperature in order to form the coating.

Before applying the components, the surface of the metal substrate is preferably subjected to a pickling process in order to remove an oxide layer completely or partially. Depending on the type of substrate, acidic or alkaline pickling may be used. Stainless steel in particular can be pickled with hydrofluoric acid or hydrochloric acid, normal steels in particular with sulphuric acid.

The first and second components (and optionally other components) are preferably mixed together shortly before application to the surface of the substrate, in order to avoid premature reaction of the components. Alternatively, according to a particular embodiment of the invention, the isocyanate compound can be provided with protective groups so that a premix with the second component can be prepared and stored for a longer period of time. Within the scope of the production process, the first component is then applied in the form of a compound having blocked isocyanate groups to the substrate and is activated by the elevated temperature.

The components are preferably allowed to react with each other at a temperature of 80 to 180° C., further preferably at a temperature of 100 to 150° C. The optimum temperature can be selected depending on the type of components used. During the course of the chemical reaction between the first, the second and optionally further components, the organic polymer is cured.

Since one or more of the components are typically present as solids, the application to the substrate is preferably carried out in an organic or aqueous solvent. The components can be present in dissolved or dispersed form in the solvent.

The components, which in particular are dissolved or dispersed in a solvent, are preferably sprayed, rolled or printed onto the substrate. Corresponding application methods are known from the prior art.

According to a preferred embodiment of the method, the substrate is provided with an embossed structure after the coating is formed. The embossed structure serves as a flow field for the supply of the operating materials in the fuel cell.

Further advantages and preferred embodiments of the method according to the invention also result from the above description of the bipolar plate according to the invention.

The present invention further relates to the use of the bipolar plate according to the invention in a low-temperature fuel cell, in particular in a polymer electrolyte fuel cell.

A further subject of the invention is a bipolar plate unit comprising two bipolar plates according to the invention, which are connected to each other, in particular welded to each other, by means of their uncoated surfaces.

These and other advantages of the invention are explained in more detail with reference to the following practical example.

EXAMPLES

Example 1

1.1 Production of the Coating 142 g of a fluorinated, hydroxy-functional polyacrylate (Zendura C 100, Honeywell) as second component are placed in a double-walled stainless steel vessel. Then, 71 g of an electroconductive carbon black (Ensaco 260G, Imerys) as filler and 250 g of butyl acetate as solvent are added to a dissolver with stirring. The mixture is dispersed to a particle size of less than 3 μm.

This mixture is then mixed with 37 g of a hexamethylene diisocyanate trimer (Tolonate HDT-LV, Vencorex) as first component using a speed mixer and is applied to a 100 μm thick stainless steel sheet (material no. 1.4404) as the substrate using a 10 μm spiral doctor blade. The components are reacted and cured for 30 min in a circulating air oven at 80° C. to form a coating according to the invention on the metal substrate. The resulting coating thickness is 7 μm.

1.2 Analysis of the Coating

The adhesion of the coating to the substrate was evaluated by means of a cross-cut test according to DIN EN ISO 2409. For this purpose, a lattice pattern is cut into the coating and the extent of flaking is analyzed visually and evaluated with a characteristic value between GT 0 and GT 5. For the exemplary coating, the best characteristic value was GT 0, i.e. no flaking was visible. The coating thus exhibits excellent adhesion to the metal substrate.

The flexibility of the coating was evaluated by means of a bending test according to DIN EN 13523-7. For this purpose, the coated substrate is repeatedly bent through 180° so that the coating is stressed by stretching. This test also resulted in the best characteristic value of T 0 for the exemplary coating. This result is particularly relevant for the possibility of providing the coated substrate with an embossed structure without damaging the coating.

The measured contact resistance of the coated substrate is 25.1 mOhm×cm$^2$, at 200 N/cm$^2$.

Example 2

2.1 Production of the Coating 142 g of a hydroxy-functional polycarbonate (Oxymer MEI 112, Perstorp) as second component are placed in a double-walled stainless steel vessel. Then, 96 g of an electroconductive carbon black (Ensaco 260G, Imerys) as filler and 637 g xylene as solvent are added to a dissolver with stirring. The mixture is dispersed to a particle size of less than 4 μm.

This mixture is then mixed with 57 g of a hexamethylene diisocyanate trimer (Tolonate HDT-LV, Vencorex) as first component and 5 g of an aminosilane (Silquest A 1170, Momentive) as third component using a speed mixer and is applied to a 100 μm thick stainless steel sheet (material no. 1.4404) as substrate using a 10 μm spiral doctor blade. The components are reacted and cured for 15 min in a circulating air oven at 150° C. to form a coating according to the invention on the metal substrate. The resulting coating thickness is 5 μm.

2.2 Analysis of the Coating

In the cross-cut test according to DIN EN ISO 2409 (see Example 1), the best characteristic value was GT 0, i.e. no flaking was visible. The coating thus has excellent adhesion to the metal substrate.

In the bending test according to DIN EN 13523-7 (see Example 1), the best characteristic value was T 0. This result is particularly relevant for the possibility of providing the coated substrate with an embossed structure without damaging the coating.

The measured contact resistance of the coated substrate is 18.3 mOhm×cm$^2$, at 200 N/cm$^2$.

Example 3

3.1 Production of the Coating 188 g of a fluorinated, hydroxy-functional polyacrylate (Zendura C 100, Honeywell) as second component are placed in a double-walled stainless steel vessel. 684 g of a titanium diboride (Grade SE, ABCR) as electroconductive filler and 141 g of butyl acetate as solvent are then added to a dissolver with stirring. The mixture is dispersed to a particle size of less than 5 μm.

This mixture is then mixed with 19 g of a hexamethylene diisocyanate trimer (Tolonate HDT-LV, Vencorex) as first component and 1.7 g of an aminosilane (Silquest A 1170, Momentive) as third component using a speed mixer and is applied to a 100 μm thick stainless steel sheet (material no. 1.4404) as substrate using a 10 μm spiral blade. The components are reacted and cured for 20 min in a circulating air oven at 150° C. to form a coating according to the invention on the metal substrate. The resulting coating thickness is 10 μm.

3.2 Analysis of the Coating

In the cross-cut test according to DIN EN ISO 2409 (see Example 1), the best characteristic value was GT 0, i.e. no flaking was visible. The coating thus exhibits excellent adhesion to the metal substrate.

In the bending test according to DIN EN 13523-7 (see Example 1), the best characteristic value was T 0. This result is particularly relevant for the possibility of providing the coated substrate with an embossed structure without damaging the coating.

The measured contact resistance of the coated substrate is 3.7 mOhm×cm$^2$, at 200 N/cm$^2$.

The invention claimed is:

1. A bipolar plate for a low-temperature fuel cell, comprising a metal substrate with a coating on one or both surfaces of the substrate, the coating comprising an organic polymer and an electroconductive filler, wherein the organic polymer is formed by chemical reaction of at least two components, comprising a bi-or polyfunctional isocyanate compound as first component and one or more compounds having at least two free hydroxy or amino groups as second component, and wherein the second component is a prepolymer having at least two free hydroxy or amino groups, said prepolymer being selected from hydroxy-or amino-functional polyolefins, polyureas, alkyd resins and polyalkylsiloxanes.

2. The bipolar plate in accordance with claim 1, wherein the first component is a bi-or polyfunctional isocyanate monomer, an oligomer of polyfunctional isocyanate monomers, or a prepolymer of polyfunctional isocyanate monomers and bi-or polyfunctional alcohols or amines.

3. The bipolar plate in accordance with claim 2, wherein the isocyanate monomer is selected from diphenylmethane-2,2'-diisocyanate, diphenylmethane-2,4'-diisocyanate, diphenylmethane-4,4'-diisocyanate, toluene-2,6-diisocyanate, toluene-2,4-diisocyanate, tetramethylxylylene diisocyanate, 1,4-diisocyanatobenzene, 1,4-bis (isocyanatomethyl) benzene, 1,3-bis (isocyanatomethyl) benzene, tetramethylene diisocyanate, pentamethylene diisocyanate, hexamethylene diisocyanate, 2,4,4-trimethylhexamethylene-1,6-diisocyanate, 2,2,4-trimethylhexamethylene-1,6-diisocyanate, dodecamethylene diisocyanate, 1,4-diisocyanatocyclohexane, 1,3-bis (isocyanatomethyl) cyclohexane, 3-isocyanatomethyl-3,5,5-trimethylcyclohexyl isocyanate, 4,4'-diisocyanatodicyclohexyl methane, and isomers thereof.

4. The bipolar plate in accordance with claim 1, wherein the one or more compounds of the second component have a molar mass in the range of 1,000 to 4,000 g/mol.

5. The bipolar plate in accordance with claim 1, wherein the second component comprises one or more fluorinated compounds.

6. The bipolar plate in accordance with claim 1, wherein the organic polymer is additionally formed from a carbodiimide as a further component.

7. The bipolar plate in accordance with claim 1, wherein the organic polymer is additionally formed from a further component which serves as an adhesion promoter to the metal substrate.

8. The bipolar plate in accordance with claim 1, wherein the electroconductive filler is selected from tungsten carbide, titanium carbide, titanium boride, titanium nitride, carbon black, graphite, graphene and carbon nanotubes.

9. The bipolar plate in accordance with claim 1, wherein the coating has a thickness in the range of 1 to 20 μm.

10. The bipolar plate in accordance with claim 1, wherein the coated metal substrate has an embossed structure.

11. The bipolar plate in accordance with claim 1, wherein the metal substrate is formed from steel, stainless steel, nickel, aluminum or titanium.

12. A method for producing the bipolar plate in accordance with claim 1, comprising the steps of:

providing the metal substrate;

applying the first, the second and optionally further components as well as the electroconductive filler to one or both surfaces of the substrate; and allowing the components to react to form the organic polymer at elevated temperature in order to form the coating.

13. The method in accordance with claim 12, wherein the first component is applied in the form of a compound having blocked isocyanate groups to the substrate.

14. The method in accordance with claim 12, wherein the components are allowed to react with each other at a temperature of 80 to 180° C.

15. The method in accordance with claim 12, wherein the components are applied in an organic or aqueous solvent.

16. The method in accordance with claim 12, wherein the components are sprayed, rolled or printed onto the substrate.

17. The method in accordance with claim 12, wherein the substrate is provided with an embossed structure after the coating is formed.

18. A bipolar plate unit comprising two bipolar plates in accordance with claim 1, which are connected to each other by means of their uncoated surfaces.

19. The bipolar plate in accordance with claim 9, wherein the coating has a thickness in the range of 3 to 15 μm.

* * * * *